(12) United States Patent
Spinelli et al.

(10) Patent No.: US 12,724,936 B2
(45) Date of Patent: Sep. 1, 2026

(54) INTERNAL GENERATION OF CONTACT ENTITIES TO MODEL CONTACT BEHAVIOR IN SIMULATIONS INVOLVING NON-CIRCULAR BEAM ELEMENTS

(71) Applicant: Dassault Systemes Americas Corp., Waltham, MA (US)

(72) Inventors: Marco Spinelli, Dartmouth, MA (US); Harrington Hunter Harkness, Canton, MA (US)

(73) Assignee: Dassault Systemes Americas Corp., Waltham, MA (US)

( * ) Notice: Subject to any disclaimer, the term of this patent is extended or adjusted under 35 U.S.C. 154(b) by 1121 days.

(21) Appl. No.: 17/455,260

(22) Filed: Nov. 17, 2021

(65) Prior Publication Data

US 2023/0153484 A1 May 18, 2023

(51) Int. Cl.
*G06F 30/20* (2020.01)
*G06F 30/12* (2020.01)
(Continued)

(52) U.S. Cl.
CPC .............. *G06F 30/20* (2020.01); *G06F 30/12* (2020.01); *G06F 30/17* (2020.01); *G06F 30/23* (2020.01);
(Continued)

(58) Field of Classification Search
CPC .......... G06F 30/20; G06F 30/12; G06F 30/17; G06F 30/23; G06F 2111/04; G06F 2119/14
See application file for complete search history.

(56) References Cited

U.S. PATENT DOCUMENTS 9,361,413 B1 * 6/2016 Bout ........................ G06F 30/17
10,121,279 B1 * 11/2018 Sundaram ............... G06T 15/20
(Continued)

FOREIGN PATENT DOCUMENTS

CN 101882168 A 11/2010
CN 102819632 A 12/2012
(Continued)

OTHER PUBLICATIONS

Magnard, Remi, "How to Analyze Beam Sections Using the Beam Section Calculator", Feb. 28, 2017, COMSOL Blog, https://www.comsol.com/blogs/how-to-analyze-beam-sections-using-the-beam-section-calculator (Year: 2017).*
(Continued)

*Primary Examiner* — Emerson C Puente
*Assistant Examiner* — Emily Gorman Leathers
(74) *Attorney, Agent, or Firm* — Hamilton, Brook, Smith & Reynolds, P.C.

(57) ABSTRACT

Embodiments of the present invention allow computer-aided design (CAD) software users to accurately model contact behavior of a real-world object with minimal simulation overhead. An embodiment automatically generates contact entities to represent extremities of a surface of a beam element model according to an indicated cross-sectional geometry of the beam element model. A mesh is established based on the automatically generated contact entities to represent geometrical aspects of the surface of the beam element model. A simulation, where the mesh is constrained according to aspects of the beam element model, is then performed to determine contact behavior of the real-world object.

18 Claims, 13 Drawing Sheets

(51) Int. Cl.

| | |
|---|---|
| ***G06F 30/17*** | (2020.01) |
| ***G06F 30/23*** | (2020.01) |
| ***G06F 111/04*** | (2020.01) |
| ***G06F 119/14*** | (2020.01) |

(52) U.S. Cl.

CPC ....... *G06F 2111/04* (2020.01); *G06F 2119/14* (2020.01)

(56) References Cited

U.S. PATENT DOCUMENTS

| | | | |
|---|---|---|---|
| 10,878,147 B1 | 12/2020 | Gelten et al. | |
| 2010/0286966 A1* | 11/2010 | Hallquist | G06F 30/23 703/2 |
| 2016/0314227 A1 | 10/2016 | Chen | |
| 2018/0189433 A1 | 7/2018 | Belsky et al. | |

FOREIGN PATENT DOCUMENTS

| | | |
|---|---|---|
| JP | 2002-207778 A | 7/2002 |
| KR | 10-0911167 B1 | 8/2009 |

OTHER PUBLICATIONS

Singh, A. V., Zheng, Y., "On finite element analysis of beams with random material properties", Oct. 2003, Probabilistic Engineering Mechanics, vol. 18, Issue 4, pp. 273-278 (Year: 2003).*

Monaghan, I., Doherty, D. and Armstrong, C., "Coupling 1D Beams to 3D Bodies", Available online Feb. 16, 2019, Department of Mechanical and Manufacturing Engineering, The Queen's University of Belfast, static.aminer.org/pdf/PDF/000/397/888/coupling_d_beams_to_d_bodies.pdf (Year: 2019).*

SimuTech Group, "Using Contact Match Mesh Control in Ansys Mechanical", Aug. 18, 2020, Youtube.com (Year: 2020).*

* cited by examiner

INTERNAL GENERATION OF CONTACT ENTITIES TO MODEL CONTACT BEHAVIOR IN SIMULATIONS INVOLVING NON-CIRCULAR BEAM ELEMENTS

BACKGROUND

Computer-aided design (CAD) software offers many benefits in enabling a user to model structural and behavioral aspects of complex real-world objects through the use of three-dimensional (3D) CAD models, e.g., finite element models and solid models, amongst others. CAD software users often seek to model not only individual static real-world objects, but also interactions between multiple real-world objects and components thereof, in order to gather information pertaining to real-world use cases of various real-world objects. Such interactions between objects often include physical contact between the objects in various states of motion.

Beam elements are a common type of component used in many industries. Therefore, beam elements are oftentimes the subject of CAD models created by CAD software users working in those industries. Contact events involving modeled beam elements are often simulated in CAD environments to evaluate the effects of components resembling beams touching, bumping, striking, or otherwise physically interacting with components, e.g. other beams or non-beam components.

SUMMARY

In existing methods, for computational simplicity, circular cross sections are often assumed in beam element modeling and behavior, e.g., contact, simulation. However, cross-sectional geometry of a beam element has a significant effect on the physical behavior of the beam element, particularly on the behavior of the beam element in a contact event. Therefore, functionality is needed to improve upon these existing methods and more accurately model and simulate physical behavior of beam elements. Embodiments provide such functionality.

One such embodiment provides these improvements by automatically generating contact entities (of a CAD model) based upon an indication of a beam element's cross-sectional geometry. An embodiment automatically creates contact entities within a CAD model to provide reference points from which to define extremities of a surface of a given modeled component, such that physical effects of a contact event between the given modeled component and another modeled component may be determined through simulation. That is, the automatically generated contact entities define or otherwise logically serve as potential points of contact on the model for purposes of simulation of modeled object behavior. The defined potential points of contact increase accuracy of simulations addressing the need in the art.

Another embodiment is directed to a computer implemented method of determining contact behavior of a real-world object that begins by creating, in memory, a beam element model representing a component of a real-world object. In such an embodiment, the beam element model includes beam nodes. To continue, the method automatically generates contact entities of the beam element model based on a cross sectional geometry of the component of the real-world object and the created beam element model. Next, such an embodiment establishes, based on the generated contact entities, a mesh representing a surface geometry of the component of the real-world object. In turn, contact behavior of the real-world object is determined by performing a computer-based simulation using the beam element model and the established mesh, where motion of the mesh is constrained to correspond to motion of the beam nodes.

In another embodiment of the method, the generated contact entities include contact nodes of the beam element model. In such an embodiment, the method includes connecting the contact nodes to establish the mesh. An embodiment connects the contact nodes in a tessellated pattern. In another embodiment, the method includes setting locations of the contact nodes based on the cross-sectional geometry. According to an embodiment, establishing the mesh includes connecting contact entities generated based on a first cross-sectional geometry with corresponding contact entities generated based on a second cross-sectional geometry.

In some embodiments, the method includes receiving a user indication of the cross-sectional geometry in the form of a keyword. In some such embodiments, the method includes providing a drop-down menu, pop-up menu, other user-selectable listing, or the like. The drop-down menu may display a plurality of keywords, or representations thereof. The user indication of the cross-sectional geometry may be received via a user selection from the drop-down menu of the keyword from among the plurality of keywords.

In some embodiments of the method, the beam will include a pair of beam nodes. In such embodiments, creating the beam element model includes (i) defining an edge between the pair of beam nodes and (ii) defining a material comprised by the beam. In some embodiments of the method, the component of the real-world object is a first component, and determining the contact behavior of the real-world object includes receiving a finite element model of a second component. In such embodiments, the method includes performing the simulation using the beam element model, the established mesh, and the received finite element model of the second component to determine the contact behavior of the first component in response to contacting the second component.

Another embodiment is directed to a system that includes a processor and a memory with computer code instructions stored thereon. In such an embodiment, the processor and the memory, with the computer code instructions, are configured to cause the system to implement any embodiments or combination of embodiments described herein.

In another embodiment, a computer program product includes a non-transitory computer-readable medium having computer-readable program instructions stored thereon. In such an embodiment, the instructions, when executed by a processor, cause the processor to implement any embodiments or combination of embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Figure 1:
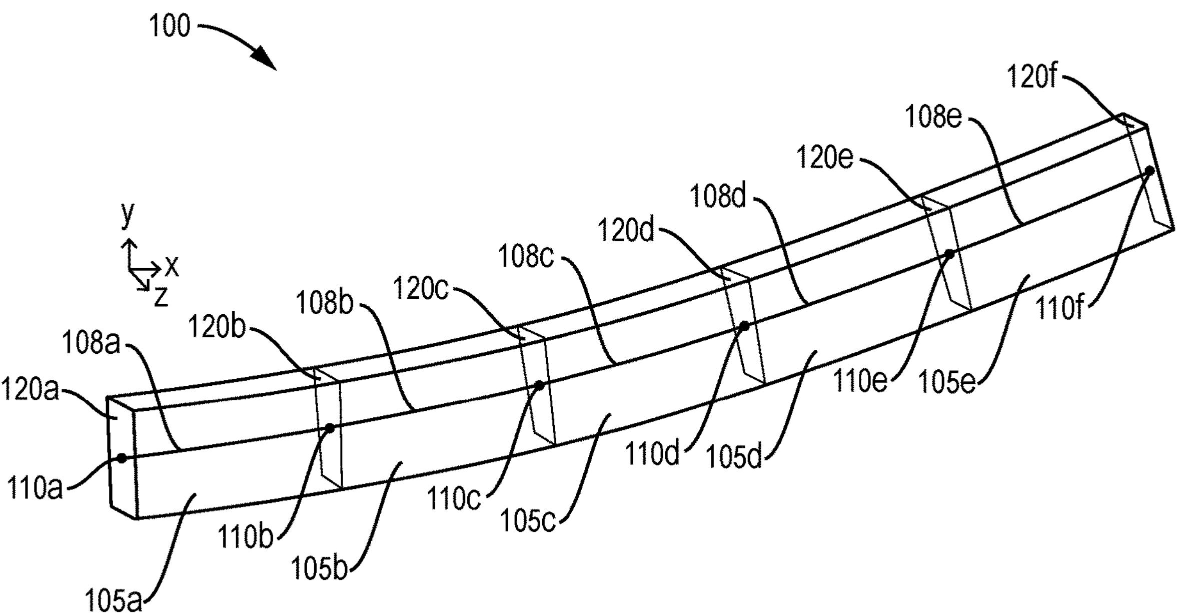
FIG. 1 illustrates a beam element model representing a component of a real-world object bending.

As described above, embodiments provide improved methods for determining physical behavior of real-word objects, in particular, beams. In computer-based simulation and modeling, e.g., finite element simulation, beam elements are modeled to demonstrate, or determine by simulation, bending or other physical responses of structures, e.g., slender structures. FIG. 1 shows a representation, i.e., model, 100 of a slender part modeled with five beam elements 105*a*, 105*b*, 105*c*, 105*d*, 105*e*, involving six beam nodes 110*a*, 110*b*, 110*c*, 110*d*, 110*e*, and 110*f*. Beam nodes 110*a-f* can be seen in FIG. 1 with line segments 108*a*, 108*b*, 108*c*, 108*d*, and 108*e* between adjacent beam nodes thereof. Such line segments represent beam edges 108*a-e*. Beam edges are described further hereinbelow, at least with respect to FIGS. 3B and 4A. Each beam element 105*a-e* is composed of a beam edge and two beam nodes. In the example model 100, the beam element 105*a* is composed of the nodes 110*a* and 110*b* connected by the edge 108*a*. The beam element 105*b* is composed of the nodes 110*b* and 110*c* connected by the edge 108*b*. The beam element 105*c* is composed of the nodes 110*c* and 110*d* connected by the edge 108*c*. The beam element 105*d* is composed of the nodes 110*d* and 110*e* connected by the edge 108*d*, and the beam element 105*e* is composed of the nodes 110*e* and 110*f* connected by the edge 108*e*.

The model 100 also depicts the cross-sectional geometries 120*a*, 120*b*, 120*c*, 120*d*, 120*e*, and 120*f* that are perpendicular to beam edges 108*a-e*, respectively. Slight variations in the depiction of cross-sectional geometries 120*a-f* can be seen in FIG. 1 as corresponding to changes in orientation of the beam element models 105*a-e*, as centered around the beam edges 108*a-e*. The cross-sectional geometries 120*a-f* are rectangular in this example, although embodiments are not limited to rectangular cross-sectional geometries and any desired cross-section shapes may be utilized. For instance, embodiments can employ cross sections for beams such as I-beams, L-beams, and U-beams, amongst other examples.

The representation 100 of FIG. 1 incorporates, as an example, three translational degrees of freedom and three rotational degrees of freedom at each node 110*a-e*, but other amounts of translational and rotational freedom may be incorporated. Beam element models 105*a-e* of the type of FIG. 1 may be used to determine contact behavior between individual beam element components of a real-world object. Such beam element models 105*a-e* may also be used to demonstrate bending properties or other responses of at least a single beam element or similar slender structure. The behaviors and properties determined using beam element components, e.g., components 105*a-e*, can be used to design, manufacture, and improve the real-world objects that the beam element components represent. Design modifications, for instance, to strengthen a beam by changing the thickness thereof, can be determined through use of the simulation methods and systems described herein.

A continuous curve characteristic of a beam subject to bending may be approximated to increasing degrees of accuracy by increasing the number of beam elements in the model, and accordingly decreasing the respective sizes of the beam elements. For example, in simulating a car crash event, a slender part like a strut can be represented with the strategy described herein such that stiffness and inertia aspects of the part (strut) are accurately and efficiently represented by beam elements. In such an example, surfaces based on membrane or surface elements may provide accurate geometric representations for contact computations.

Figure 2A:
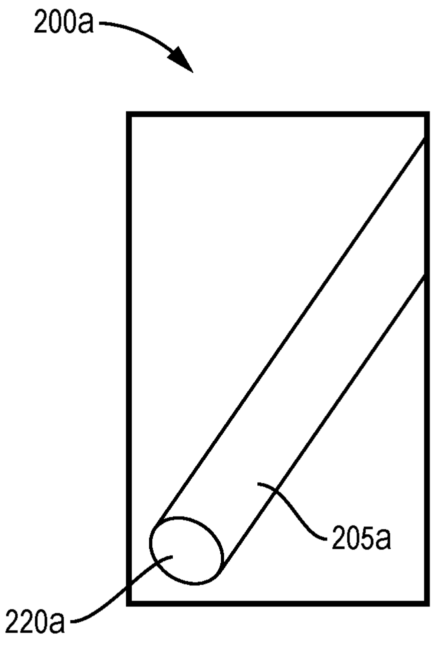
FIGS. 2A-B illustrate beam element models representing an example component of a real-world object.

Historically, regardless of the actual cross-sectional area of the beam, existing simulation methods model the beam with a circular cross section. This is shown in FIG. 2A, where a representation 200*a* of a beam element model 205*a* with a circular cross-sectional geometry 220*a* is depicted. However, treating all beams as circular is problematic. For instance, representing an I-beam using a circular cross section beam can lead to inaccurate simulation results.

Figure 2B:
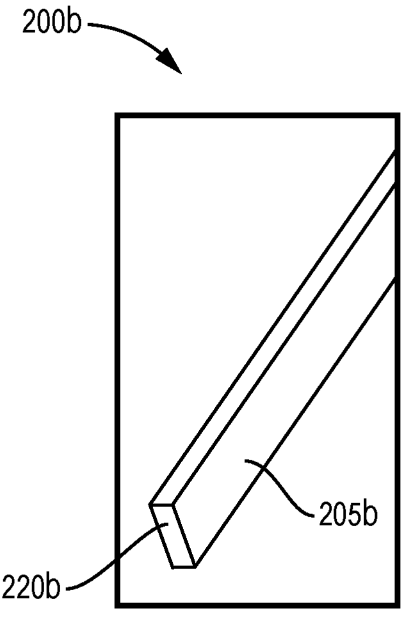

As such, realistic representations for beams with rectangular and other cross sections are needed. FIG. 2B depicts one such example representation 200*b* of a beam element model 205*b* with a rectangular cross-sectional geometry 220*b* that can be accurately and realistically simulated using the embodiments described herein. By using the embodiments described herein, behavior, e.g., physical behavior of the beam element model 205*b* in a contact event, can be accurately determined.

Figure 3A:
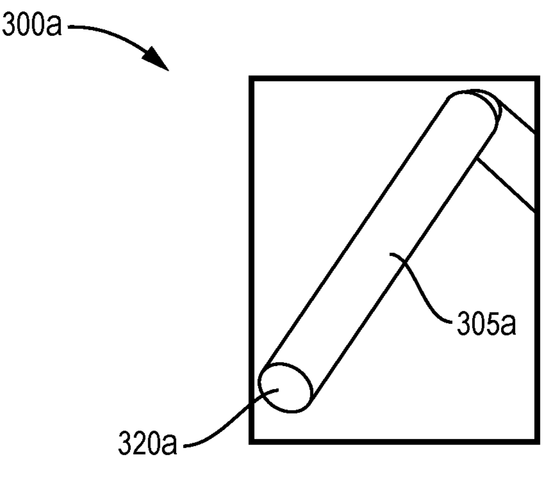
FIGS. 3A-C illustrate beam element models representing an example component of a real-world object at various stages of modeling according to an embodiment.

FIG. 3A shows a representation 300*a* of a beam element model 305*a*. The beam element model 305*a* is shown to have a circular cross-sectional geometry 320*a*. The circular cross-sectional geometry 320*a* provides for efficient computation with regards to movement or other aspects of the beam element model 305*a*. However, the circular cross-sectional geometry 320*a* does not provide for accurate simulation of the effects of a contact event when the real-world object represented by the model 305*a* does not have a circular cross-sectional geometry in the real-world. For example, the beam element model 305*a*, or an object contacting the beam element represented by the beam element model 305*a*, may exhibit differences in deflection of motion as a result of a contact event therebetween.

For a beam element having a circular cross-sectional geometry, such that the beam element is represented as a cylinder as illustrated in FIG. 3A, the contact force to resist penetration is aligned with the radial direction from a beam edge to the point mass. Such a beam edge is defined along a longitudinal axis of the beam element, and runs internally to the cylindrical representation of the beam element. Further description of beam edges is provided hereinbelow. Simulating contact requires efficiently and accurately determining when and where impacts and/or penetrations occur, as well as determining magnitudes and directions of contact forces that resist penetrations and model frictional behavior.

Figure 3B:
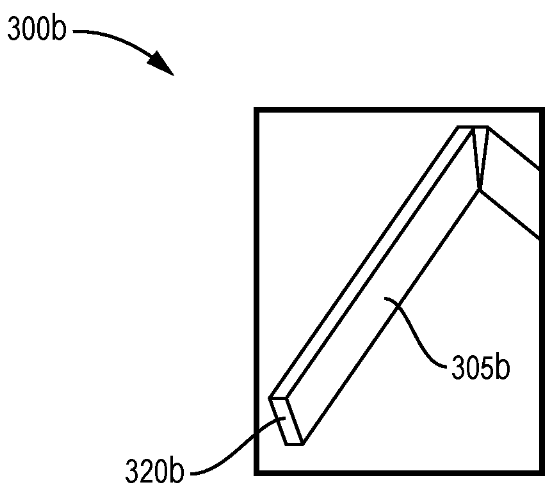

However, the radial direction is not relevant for non-circular cross sections, as are commonly simulated within the CAD software environment by industry users, since the contact force to resist penetration should typically be normal to the beam exterior. FIG. 3B shows a representation 300*b* of a beam element model 305*b* with a rectangular cross-sectional geometry 320*b*. Such a beam element model 305*b*, by its rectangular cross-sectional geometry 320*b*, may more accurately model a given beam element, and thus more accurately simulate contact events involving the given beam element.

One improvement to the historic method of modeling all beams as having a circular cross-sectional area requires a user to perform a tedious manual procedure. This manual procedure requires the following strategy to attempt to more realistically treat the beam cross section shape in contact calculations. First, beam elements are used to represent physical stiffness behavior of a part or component. Next, a mesh of membrane elements with negligible stiffness (or "surface elements" with no stiffness) are built in memory around the beam elements to represent a surface geometry of the part. The user manually specifies a nodal position of every membrane or surface element. Specifying a greater number of membrane or surface elements may enable the surface geometry of the part to be represented with more accuracy. Typical applications may require the user to manually specify, for example, over one hundred, over one thousand, or more membrane or surface elements for a single beam element. Finally, nodal positions of the membrane or surface elements are constrained to move according to motion of beam nodes. The user establishes such constraints for every membrane or surface element of the beam, forcing coordinates of the membranes or surface elements to be dependent upon coordinates of the beam nodes.

Fundamental entities involved in contact calculations within a finite element simulation include nodes (representing points), edges (one-dimensional segments connecting nodes), and faces (two-dimensional polygons, usually representing exposed sides of finite elements with nodes at vertices of the faces). Beam nodes, such as beam nodes 110*a-f* of FIG. 1, are located along a beam reference line, or the longitudinal axis of a beam. Beam edges, such as beam edges 108*a-e* of FIG. 1, connect beam nodes. A beam edge can be used to determine a radial direction from the beam edge to another point. A beam edge can be used to determine an axial position where another point projects to the beam edge along the radial direction. Beam edges may not always be disposed along the surface of a modeled beam, but rather, may be disposed internally to the modeled beam. Faces connecting beam nodes do not naturally exist, as beam edges usually run internally to their respective beams.

In addition to beam nodes and beam edges, other types of entities that may be involved in contact calculations within a finite element simulation include contact entities such as contact nodes, contact edges, and contact faces. Data pertaining to contact nodes, for example, may be used in such contact calculations, while data pertaining to contact edges and faces may be generated by such contact calculations.

Figure 3C:
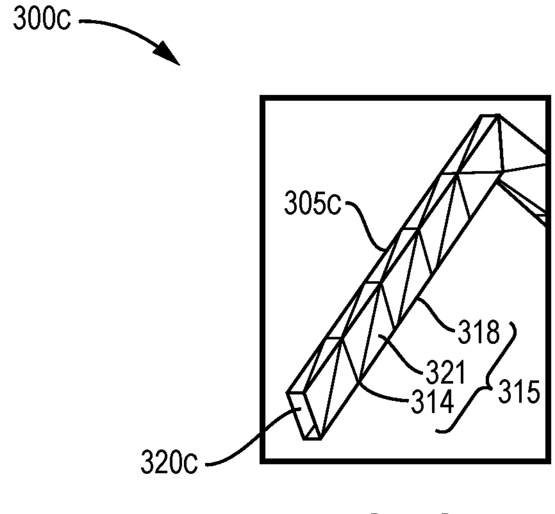

FIG. 3C shows a mesh representation 300*c* of a beam element model 305*c* using a rectangular cross-sectional geometry 320*c*, wherein contact nodes 314, contact edges 318, and contact faces 321 embody contact entities 315 that are connected to form the mesh 300*c*. The mesh 300*c* represents surface geometry of the beam element model 305*c* and may be constrained to correspond to motion of the beam element model 305*c* or aspects thereof. The mesh 300*c* illustrated in FIG. 3C has a tessellated pattern formed by the contact nodes 314, and the contact edges 318 and contact faces 321. Is it noted that embodiments are not limited to tessellated mesh representations and any mesh representation may be utilized.

Figure 4A:
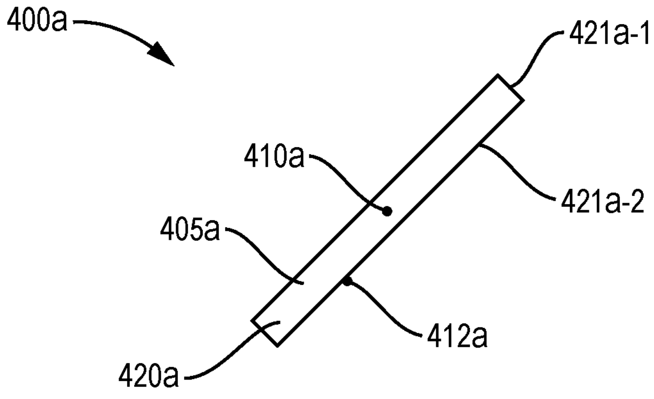
FIGS. 4A-C illustrate beam element models representing an example component of a real-world object at various stages of responding to contacting a modeled point mass according to an embodiment.

FIG. 4A shows a front view 400*a* of a beam element model 405*a* wherein a beam node 410*a* is centrally located within a cross-section 420*a* of the beam element model 405*a*, and wherein a modeled point mass 412*a* is, according to a simulation, travelling from right to left and presently impacting the beam element model 405*a*. Beam nodes may herein be referred to interchangeably as beam element nodes. The beam element model 405*a* is shown in FIG. 4A as having an oblong rectangular cross-sectional geometry 420*a*. The beam element model 405*a* is shown in FIG. 4A as being viewed directly from an end of the beam exhibiting the oblong rectangular cross-sectional geometry 420*a*, such that the longitudinal axis of the beam element model 405*a* is perpendicular to the plane of the page, screen, or other means of display upon which FIG. 4A is viewed. Beam node 410*a* may be a proximal beam node connected to at least one distal beam node located apart from the proximal beam node such that a beam edge connecting said proximal and distal beam node is oriented in a parallel direction to a lengthwise direction of the beam 405*a*. The proximal and distal beam node, along with the beam edge situated therebetween, together influence determination of contact entities related to a surface geometry of the beam. Surfaces representing contact faces 421*a*-1, 421*a*-2, with constituent edges disposed along the length of the beam, are not visible in FIG. 4A beyond a single respective edge thereof, due to the aforementioned perpendicular orientation of the beam element model 405*a* of FIG. 4A.

Figure 4B:
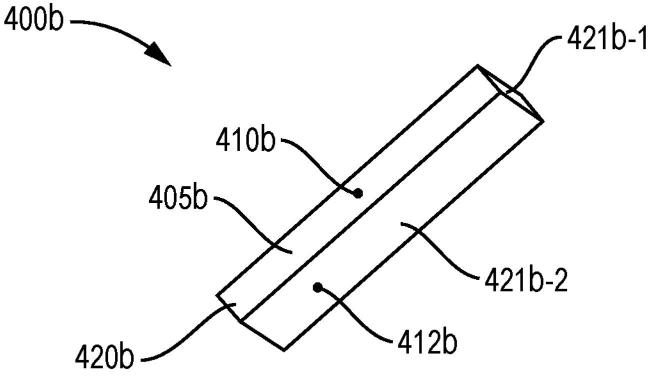

FIG. 4B shows an isometric view 400*b* of a beam element model 405*b* having beam node 410*b*. Beam element model 405*b* of FIG. 4B illustrates an altered orientation of the beam element model 405*a* of FIG. 4A at a time shortly after undergoing a contact event. In the contact event, the beam element model 405*b* reacts as if the beam element has been impacted by a moving point mass modeled by point mass 412*b*. As can be seen in FIG. 4B, contact with the point mass 412*b* has caused the beam element model 405*b* to begin to rotate, thus beginning to reveal a pair of surfaces representing contact faces 421*b*-1, 421*b*-2 with constituent edges disposed along the length of the beam 405*a*. Oblong rectangular cross-sectional geometry 420*b* is easily visible in FIG. 4B despite the rotated orientation. More difficult to discern from FIG. 4B, but helpful to understand, is that at the depicted time shortly after the contact event, the modeled point mass 412*b* has bounced off the beam element model 405*b* and is travelling in a direction different from its initial direction of travel before impact (the contact event).

Figure 4C:
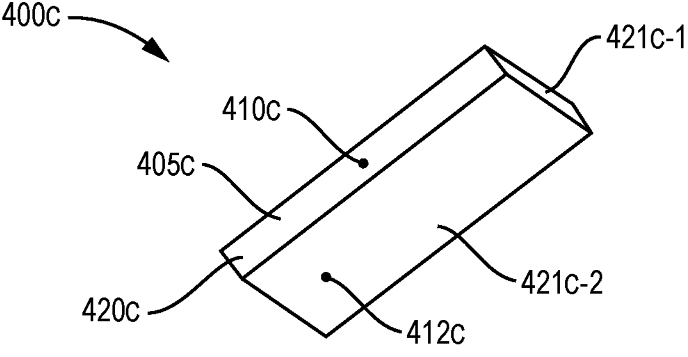

FIG. 4C shows a representation 400*c* of a beam element model 405*c* having beam node 410*c*. Beam element model 405*c* of FIG. 4C illustrates a further altered orientation of the beam element model 405*b* of FIG. 4B after additional time has passed since the aforementioned contact event than had passed in the representation 400*b* of FIG. 4B. In FIG. 4C, the beam element model 405*c* can be seen to have assumed a further rotated orientation versus the orientation depicted by the view of representation 400*b* in FIG. 4B and described hereinabove. Modeled point mass 412*c*, surfaces representing contact faces 421*c*-1, 421*c*-2, and cross-sectional geometry 420*c* are visible in FIG. 4C as are their respective counterparts 412*b*, 421*b*-1, 421*b*-2, 420*b* in FIG. 4B.

Figure 5:
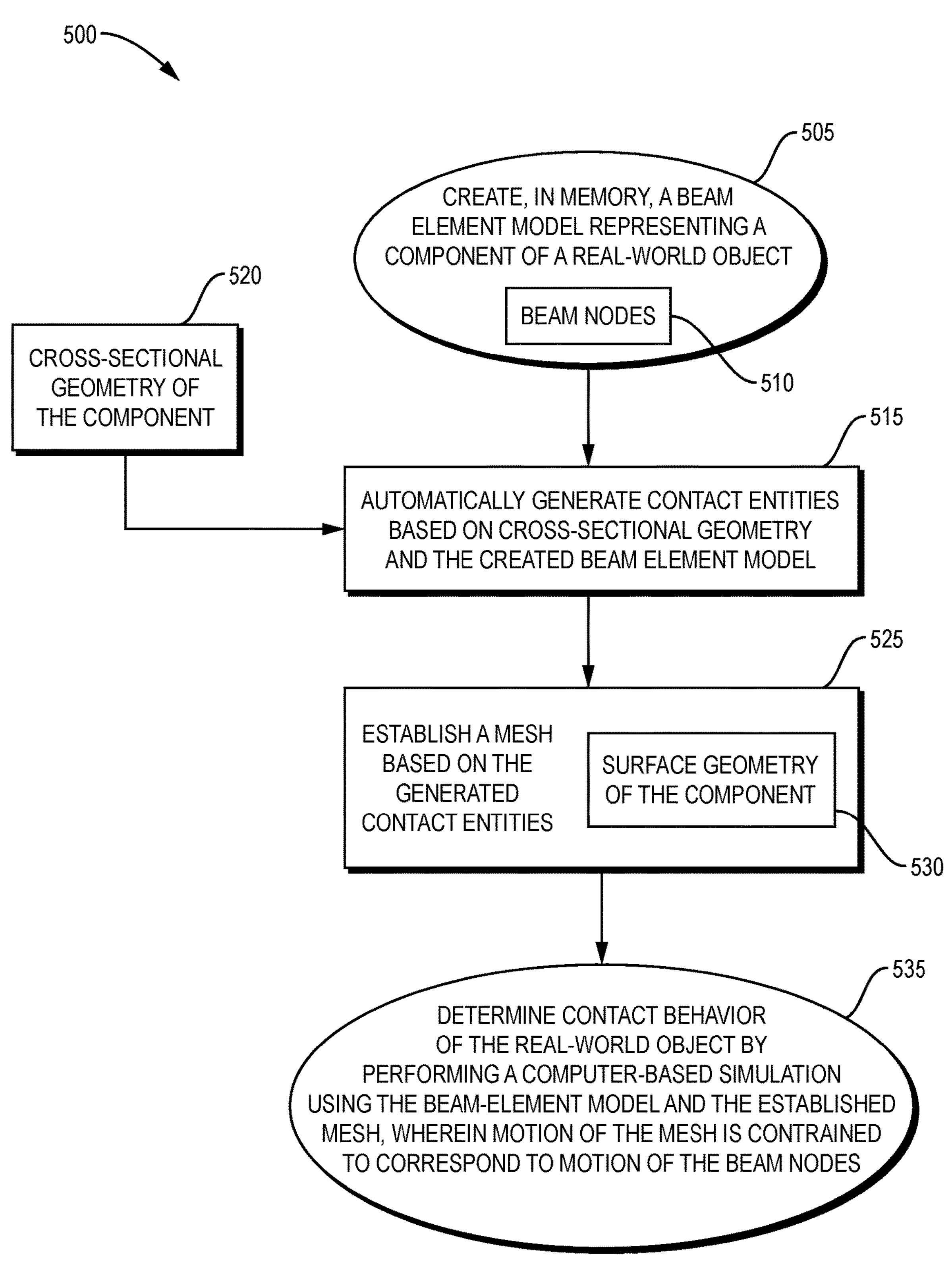
FIG. 5 is a flow diagram of various example methods of automatically determining contact behavior of a real-world object according to embodiments.

FIG. 5 illustrates a computer implemented method 500 of determining contact behavior of a real-world object according to an example embodiment. The method 500 begins by creating 505 a beam element model in computer memory. In the embodiment, the beam element model created 505 represents a component of a real-world object and includes one or more beam nodes 510. The one or more beam nodes 510 are located along a beam reference line, or longitudinal axis of a beam model 505, as illustrated by beam nodes 110*a-f* of FIG. 1. The one or more beam nodes may be centrally located within a cross-section of the beam element model 505, as illustrated by beam nodes 410*a-c* of FIGS. 4A-C. Typically, the beam element model created 505 includes multiple beam nodes 510. Multiple beam nodes 510 may include a proximal beam node and a distal beam node, disposed at opposing longitudinal ends of a beam element model 505. The beam element model created 505 includes a beam edge, such as any of beam edges 108*a-e* of FIG. 1, represented by a line segment that (i) connects a pair of adjacent beam nodes and (ii) defines the length and orientation of a corresponding segment of the beam element model 505.

The method 500 continues and contact entities (of or for the beam element model) are automatically generated 515 based on both a cross sectional geometry 520 of the real-world component and the beam element model created 505. In the embodiment, a mesh is established 525 based on the generated contact entities 515. The established mesh 525 represents surface geometry 530 of the component of the real-world object. To continue, contact behavior of the real-world object is determined 535 by performing a computer-based simulation using the created beam element model 505 and the established mesh 525. In the simulation, motion of the mesh is constrained to correspond to motion of the beam nodes 510. Accordingly, the automatically generated contact entities define or otherwise logically serve as potential points of contact on the model for purposes of simulation of modeled object behavior. Such defined points of contact increase accuracy of simulations heretofore unachieved.

In embodiments, e.g., the method 500, the automatically generated contact nodes, contact edges, and contact faces (surface portions or sub-surface portions of the established mesh) can mostly participate as equals with other contact nodes, contact edges, and contact faces in a contact simulation performed at step 535 to detect, for example, penetrations, and compute contact forces acting on contact nodes.

In performing the simulation at step 535 contact forces acting on automatically-generated contact nodes of the present disclosure may be redirected to nodal forces and moments of the same beam nodes that control their motion, such that subsequent motion and rotation of beam nodes is properly influenced by contact forces. This may be accomplished with force redistribution equations common or known in the art.

In an alternative embodiment based on the aforementioned example embodiment 500, automatically generated contact entities 515 include contact nodes such as the contact nodes 314 of the mesh representation 300*c* shown in FIG. 3C. In such an embodiment, establishing a mesh 525 includes connecting the contact nodes 314. The contact nodes 314 may be connected in a tessellated pattern as shown and described hereinabove with reference to FIG. 3C.

In yet another alternative embodiment based upon the aforementioned example embodiment 500, a method establishes a mesh 525 based on contact entities 515 that are automatically generated based on multiple cross-sectional geometries 520. In such an embodiment, the multiple cross-sectional geometries 520 include at least a first cross-sectional geometry and a second cross-sectional geometry. To continue, the method includes connecting the contact entities generated based on the first cross-sectional geometry with the contact entities generated based on the second cross-sectional geometry.

Another embodiment of the method 500 includes obtaining an indication of a cross-sectional geometry 520 of a component of a real-world object from a user. In the non-limiting example embodiment, a drop-down menu is provided. The provided drop-down menu may display a plurality of keywords, or representations thereof. In such an implementation, a user indication of the cross-sectional geometry 520 is received in the form of a keyword selected by the user from among the plurality of keywords displayed by the provided drop-down menu. Pop-up menus, other user interactive listings of keywords or representations thereof, other graphical user interface widgets, and the like are suitable.

In yet another example embodiment based upon the aforementioned example embodiment 500, beam nodes 510 include a pair of beam nodes defined respectively at proximal and distal ends of a beam element model 505, such as, for example, beam nodes 110*a* and 110*b* of FIG. 1. In this non-limiting example embodiment, a beam edge, like beam edge 108*a* of FIG. 1, is defined within the beam element model 505, between the subject pair of beam nodes. To continue, a material, comprised by the component represented by the beam element model 505, is defined. A beam element model is thus created 505, according to the present example embodiment, based on information including length, orientation, and material of a beam element.

In yet another alternative embodiment based on the aforementioned example embodiment 500, a beam element model 505, representing a first component of the real-world object, is created. In the example embodiment, a finite element model of a second component of the real-world object is received. To continue, contact behavior of a real-world object is determined 535 by performing a computer-based simulation using the created beam element model 505 of the first component, the corresponding established mesh 525, and the received finite element model of the second component. This simulation determines contact behavior of the first component in response to contacting the second component. In the simulation, motion of the mesh 525 is constrained to correspond to the motion of the beam nodes 510.

Figure 6A:
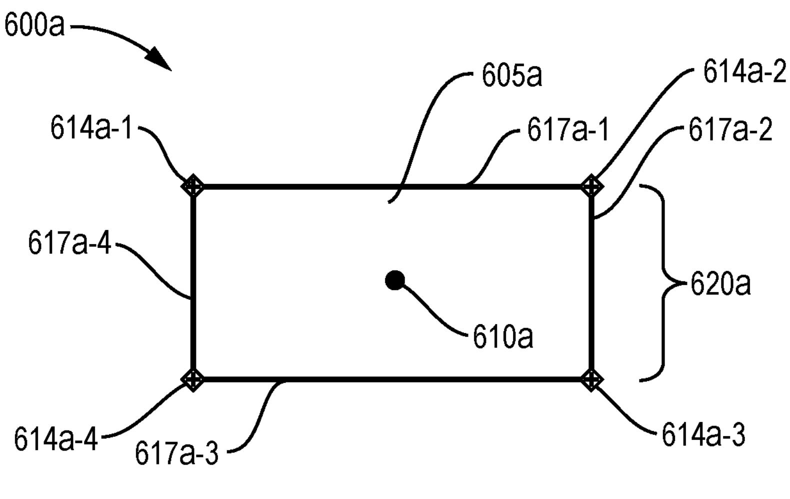
FIGS. 6A-C illustrate example beam element model cross-sectional geometries with various optional corner radii according to an embodiment.
Figure 6B:
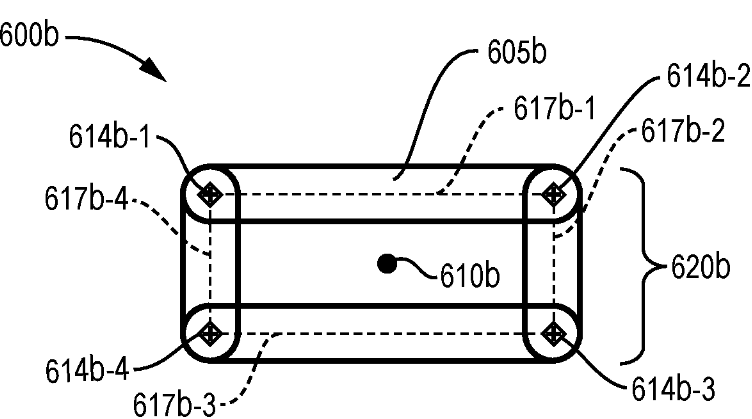
Figure 6C:
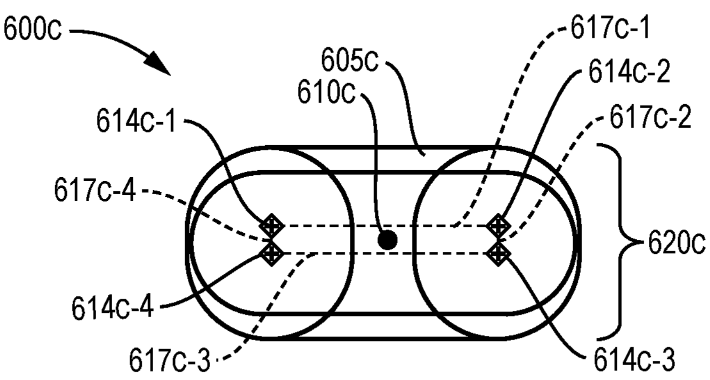

FIGS. 6A-C respectively show representations 600*a*, 600*b*, 600*c* of example beam element models 605*a*, 605*b*, 605*c* having various example cross-sectional geometries 620*a*, 620*b*, 620*c*. The beam element models 605*a*, 605*b*, 605*c* may be created at step 505 of the method 500 and used to determine contact behavior at step 535 of the method 500. The example cross-sectional geometries 620*a*, 620*b*, 620*c* show different amounts of rounding of corners. Further context will be provided by FIG. 7, to be described hereinbelow, using a cross-sectional geometry resembling that of 620*b* of FIG. 6B.

FIG. 6A shows contact nodes 614*a*-1, 614*a*-2, 614*a*-3, and 614*a*-4. The contact nodes 614*a*-1 through 614*a*-4 are connected by contact edges 617*a*-1, 617*a*-2, 617*a*-3, and 617*a*-4 where the contact edge 617*a*-1 connects the contact nodes 614*a*-1 and 614*a*-2, the contact edge 617*a*-2 connects the contact nodes 614*a*-2 and 614*a*-3, the contact edge 617*a*-3 connects the contact nodes 614*a*-3 and 614*a*-4, and the contact edge 617*a*-4 connects the contact nodes 614*a*-4 and 614*a*-1. More context regarding contact edges 617*a*-1 through 617*a*-4 is provided hereinbelow, in reference to proximal contact edges 717-1 through 717-4 and distal contact edges 716-1 through 716-4 illustrated by FIG. 7. The contact nodes 614*a*-1 through 614*a*-4, interconnected by the contact edges 617*a*-1 through 617*a*-4, define a rectangular area that corresponds directly to the rectangular cross-sectional geometry 620*a*, centered around beam node 610*a*.

FIG. 6B shows contact nodes 614*b*-1, 614*b*-2, 614*b*-3, 614*b*-4. The contact nodes 614*b*-1 through 614*b*-4 are connected by contact edges 617*b*-1, 617*b*-2, 617*b*-3, and 617*b*-4 where the contact edge 617*b*-1 connects the contact nodes 614*b*-1 and 614*b*-2, the contact edge 617*b*-2 connects the contact nodes 614*b*-2 and 614*b*-3, the contact edge 617*b*-3 connects the contact nodes 614*b*-3 and 614*b*-4, and the contact edge 617*b*-4 connects the contact nodes 614*b*-4 and 614*b*-1. More context regarding contact edges 617*b*-1 through 617*b*-4 is provided hereinbelow, in reference to proximal contact edges 717-1 through 717-4 and distal contact edges 716-1 through 716-4 illustrated by FIG. 7. The contact nodes 614*b*-1 through 614*b*-4, interconnected by the contact edges 617*b*-1 through 617*b*-4, define a rectangular area, shown to exist within the dotted lines in FIG. 6B. Also included is a corner radius parameter applied circularly around contact nodes 614*b*-1 through 614*b*-4. The rectangular area shown within the dotted lines, when combined with the corner radius parameter applied as described, results in the rectangular cross-sectional geometry with rounded corners 620*b*, centered around beam node 610*b*. The corner radius parameter may be used as described to impart a dimension of surface thickness to the beam element model 605*b*.

FIG. 6C shows contact nodes 614*c*-1, 614*c*-2, 614*c*-3, 614*c*-4. The contact nodes 614*c*-1 through 614*c*-4 are connected by contact edges 617*c*-1, 617*c*-2, 617*c*-3, and 617*c*-4 where the contact edge 617*c*-1 connects the contact nodes 614*c*-1 and 614*c*-2, the contact edge 617*c*-2 connects the contact nodes 614*c*-2 and 614*c*-3, the contact edge 617*c*-3 connects the contact nodes 614*c*-3 and 614*c*-4, and the contact edge 617*c*-4 connects the contact nodes 614*c*-4 and 614*c*-1. More context regarding contact edges 617*c*-1 through 617*c*-4 is provided hereinbelow, in reference to proximal contact edges 717-1 through 717-4 and distal contact edges 716-1 through 716-4 illustrated by FIG. 7. The contact nodes 614*c*-1 through 614*c*-4, interconnected by the contact edges 617*c*-1 through 617*c*-4, define a rectangular area, shown to exist within the dotted lines in FIG. 6C. Also included is a corner radius parameter applied circularly around contact nodes 614*c*-1, 614*c*-2, 614*c*-3, 614*c*-4, which is larger than the corner radius parameter of FIG. 6B. The rectangular area shown within the dotted lines, when combined with the corner radius parameter applied as described, results in the rectangular cross-sectional geometry with rounded corners 620*c*, centered around beam node 610*c*, wherein the rounded corners are larger than those of FIG. 6B. The corner radius parameter may be used as described to impart a dimension of surface thickness to the beam element model 605*c*. The larger corner radius parameter of FIG. 6C, in comparison to that of FIG. 6B, thus imparts a larger surface thickness dimension to FIG. 6C than the surface thickness dimension of FIG. 6B.

Figure 7:
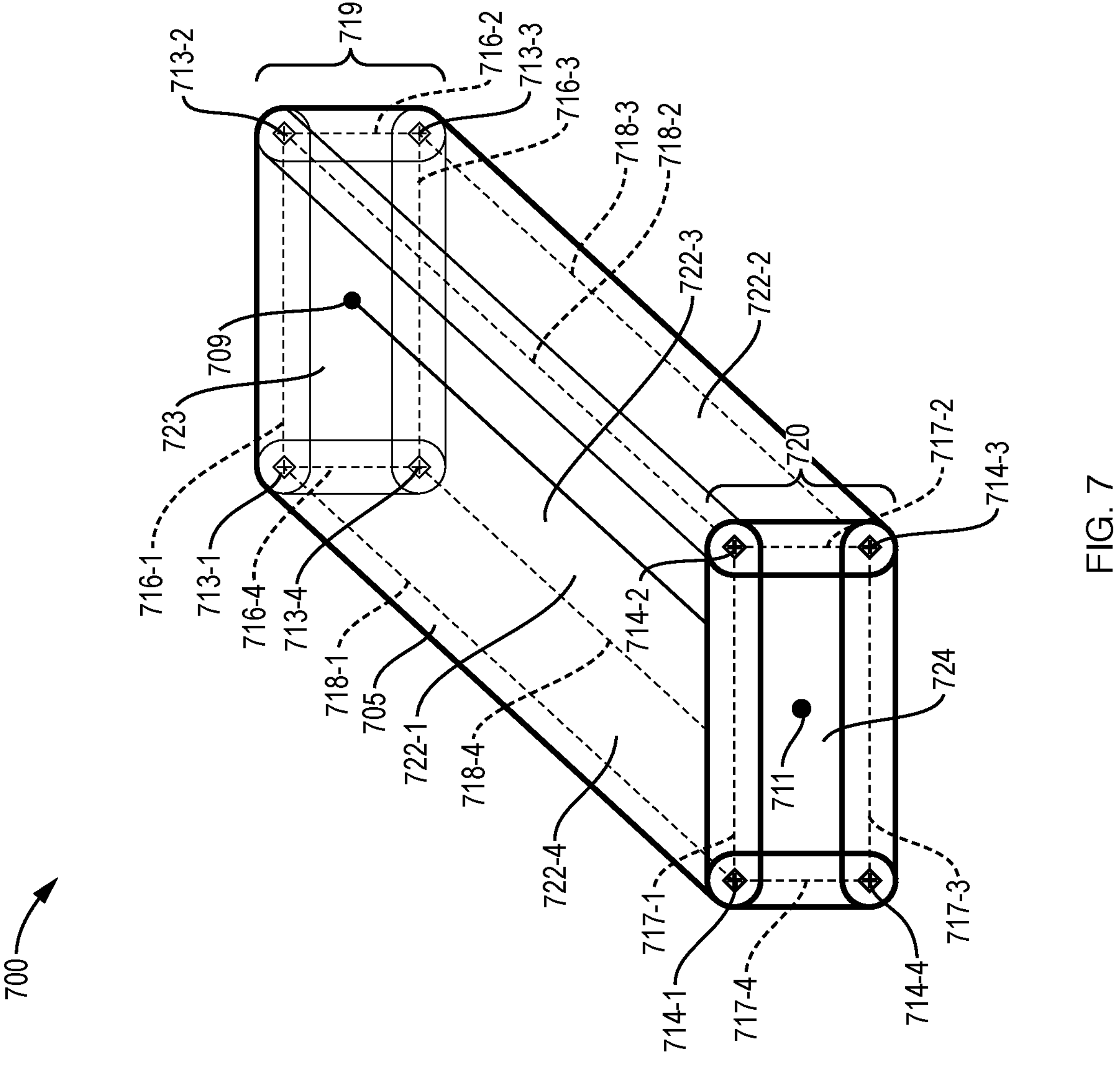
FIGS. 7 and 8A illustrate beam element models with example cross-sectional geometries according to embodiments.

FIG. 7 shows a representation 700 of an example beam element model 705 exhibiting the moderately rounded corners of FIG. 6B. In FIG. 7, the rounded corners incorporate an element of surface thickness to the beam element model 705. The beam element model 705 is constructed based on proximal beam node 711 and distal beam node 709 located apart from proximal beam node 711. At corresponding longitudinal ends, proximal contact nodes 714-1, 714-2, 714-3, 714-4 and distal contact nodes 713-1, 713-2, 713-3, 713-4 are shown.

Contact edges, specifically longitudinal contact edges 718-1, 718-2, 718-3, 718-4, can be seen in FIG. 7 respectively connecting corresponding proximal 714-1, 714-2, 714-3, 714-4 and distal 713-1, 713-2, 713-3, 713-4 contact nodes. Further, the representation 700 includes additional contact edges, particularly, proximal contact edges 717-1, 717-2, 717-3, and 717-4 connecting the proximal contact nodes 714-1, 714-2, 714-3, and 714-4. In particular, contact edge 717-1 connects contact nodes 714-1 and 714-2, contact edge 717-2 connects contact nodes 714-2 and 714-3, contact edge 717-3 connects contact nodes 714-3 and 714-4, and contact edge 717-4 connects contact nodes 714-4 and 714-1. Likewise, the representation 700 includes additional contact edges, particularly distal contact edges 716-1, 716-2, 716-3, and 716-4, connecting distal contact nodes 713-1, 713-2, 713-3, and 713-4. Contact edge 716-1 connects contact nodes 713-1 and 713-2, contact edge 716-2 connects contact nodes 713-2 and 713-3, contact edge 716-3 connects contact nodes 713-3 and 713-4, and contact edge 716-4 connects contact nodes 713-4 and 713-1.

Contact faces, specifically longitudinal contact faces 722-1, 722-2, 722-3, 722-4 are shown in FIG. 7 to be formed between sets of contact nodes and edges as follows: {face 722-1 formed by nodes 714-1, 714-2, 713-2, 713-1 connected by edges 717-1, 718-2, 716-1, 718-1}, {face 722-2 formed by nodes 714-2, 714-3, 713-3, 713-2 connected by edges 717-2, 718-3, 716-2, 718-2}, {face 722-3 formed by nodes 714-3, 714-4, 713-4, 713-3 connected by edges 717-3, 718-4, 716-3, 718-3}, and {face 722-4 formed by nodes 714-4, 714-1, 713-1, 713-4 connected by edges 717-4, 718-1, 716-4, 718-4}.

Also shown in the representation 700 of FIG. 7, coplanar to the respective beam nodes 711 and 709, are additional contact faces, specifically a proximal contact face 724 and a distal contact face 723, drawn respectively according to user-specified rectangular proximal cross-sectional geometry 720 and distal cross-sectional geometry 719. Proximal contact face 724 is formed by nodes 714-1, 714-2, 714-3, 714-4 connected by edges 717-1, 717-2, 717-3, 717-4. Distal contact face 723 is formed by nodes 713-1, 713-2, 713-3, 713-4 connected by edges 716-1, 716-2, 716-3, 716-4.

Contact entities, which may be generated according to step 515 of the method 500, are shown in the representation 700 to include proximal contact nodes 714-1, 714-2, 714-3, 714-4, and distal contact nodes 713-1, 713-2, 713-3, 713-4; longitudinal contact edges 718-1, 718-2, 718-3, 718-4, proximal contact edges 717-1, 717-2, 717-3, 717-4, and distal contact edges 716-1, 716-2, 716-3, 716-4; and longitudinal contact faces 722-1, 722-2, 722-3, 722-4, proximal contact face 724, and distal contact face 723, all as detailed hereinabove.

Additionally, rounded corners have been incorporated into the cross-sectional geometries 720, 719 through inclusion of a corner radius parameter as introduced hereinabove with reference to FIG. 6B. The corner radius parameter dictates surface thickness of the beam element model 705. As such, contact edges 718-1, 718-2, 718-3, 718-4 may not represent locations along the surface of the beam element model 705, but rather a central axis of a cylinder defined by the corner radius applied to the cross-sectional geometries 719, 720 and centered about the contact nodes 714-1, 714-2, 714-3, 714-4, 713-1, 713-2, 713-3, 713-4. A portion of the surface of the cylinder may thus actually represent at least a portion of the surface of the beam element model 705. According to the present disclosure, a mesh, such as mesh 300*c* of FIG. 3C, may be generated surrounding a beam element model, e.g., model 705, based on the automatically generated contact entities 515, e.g., contact entities 714-1, 714-2, 714-3, 714-4, 713-1, 713-2, 713-3, 713-4, 718-1, 718-2, 718-3, 718-4, 717-1, 717-2, 717-3, 717-4, 716-1, 716-2, 716-3, 716-4, 722-1, 722-2, 722-3, 722-4, 724, 723. Motion of the mesh may then be constrained to follow motion of the beam element model 705, e.g., according to step 535 of the method 500 of FIG. 5, based on the automatically generated contact entities 515.

Figure 8A:
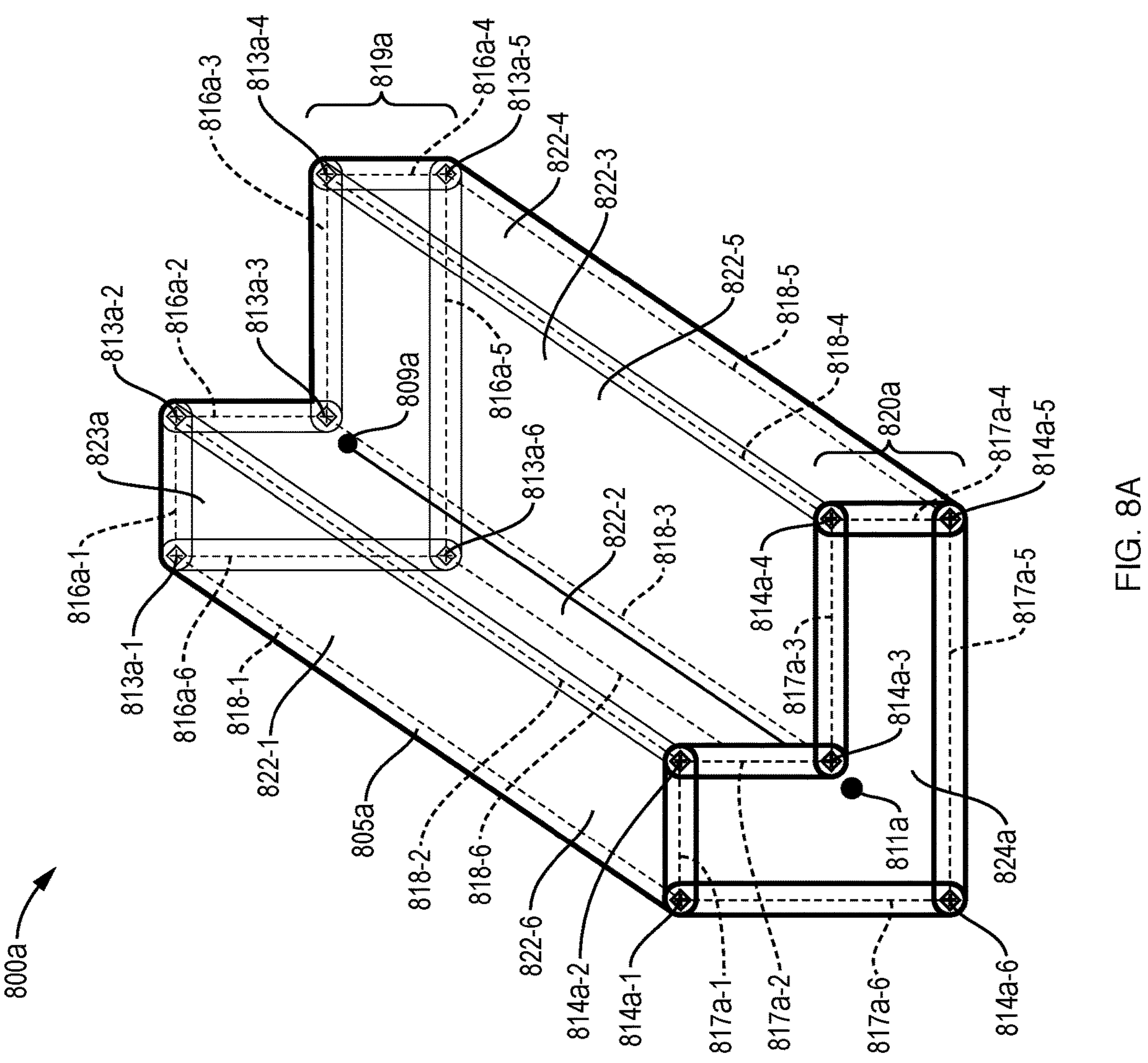

FIG. 8A shows a representation 800*a* of an example beam element model 805*a* for a type of beam commonly known as an L-beam, wherein an L-shaped cross-sectional geometry 820*a*, 819*a* has been specified. The representation 800*a* is but one example of beam models that may be created and modeled using embodiments and other example beam types may be similarly represented, including, but not limited to, I-beams and U-beams. The beam element model 805*a* is constructed based on proximal beam node 811*a* and distal beam node 809*a*, shown at opposing longitudinal ends of the beam 805*a*. At corresponding longitudinal ends, proximal contact nodes 814*a*-1, 814*a*-2, 814*a*-3, 814*a*-4, 814*a*-5, 814*a*-6 and distal contact nodes 813*a*-1, 813*a*-2, 813*a*-3, 813*a*-4, 813*a*-5, 813*a*-6 are shown.

Contact edges, specifically longitudinal contact edges 818-1, 818-2, 818-3, 818-4, 818-5, 818-6 can be seen in FIG. 8A respectively connecting corresponding proximal 814*a*-1, 814*a*-2, 814*a*-3, 814*a*-4, 814*a*-5, 814*a*-6 and distal 813*a*-1, 813*a*-2, 813*a*-3, 813*a*-4, 813*a*-5, 813*a*-6 contact nodes. Further, the representation 800*a* includes additional contact edges, particularly, proximal contact edges 817*a*-1, 817*a*-2, 817*a*-3, 817*a*-4, 817*a*-5, and 817*a*-6 connecting the proximal contact nodes 814*a*-1, 814*a*-2, 814*a*-3, 814*a*-4, 814*a*-5, and 814*a*-6. In particular, contact edge 817*a*-1 connects contact nodes 814*a*-1 and 814*a*-2, contact edge 817*a*-2 connects contact nodes 814*a*-2 and 814*a*-3, contact edge 817*a*-3 connects contact nodes 814*a*-3 and 814*a*-4, contact edge 817*a*-4 connects contact nodes 814*a*-4 and 814*a*-5, contact edge 817*a*-5 connects contact nodes 814*a*-5 and 814*a*-6, and contact edge 817*a*-6 connects contact nodes 814*a*-6 and 814*a*-1. Likewise, the representation 800*a* includes additional contact edges, particularly distal contact edges 816*a*-1, 816*a*-2, 816*a*-3, 816*a*-4, 816*a*-5, and 816*a*-6, connecting distal contact nodes 813*a*-1, 813*a*-2, 813*a*-3, 813*a*-4, 813*a*-5, and 813*a*-6. Contact edge 816*a*-1 connects contact nodes 813*a*-1 and 813*a*-2, contact edge 816*a*-2 connects contact nodes 813*a*-2 and 813*a*-3, contact edge 816*a*-3 connects contact nodes 813*a*-3 and 813*a*-4, contact edge 816*a*-4 connects contact nodes 813*a*-4 and 813*a*-5, contact edge 816*a*-5 connects contact nodes 813*a*-5 and 813*a*-6, and contact edge 816*a*-6 connects contact nodes 813*a*-6 and 813*a*-1.

Contact faces, specifically longitudinal contact faces 822-1, 822-2, 822-3, 822-4, 822-5, 822-6 are shown in FIG. 8A to be formed between sets of contact nodes as follows: {face 822-1 formed by nodes 814*a*-1, 814*a*-2, 813*a*-2, 813*a*-1 connected by edges 817*a*-1, 818-2, 816*a*-1, 818-1}, {face 822-2 formed by nodes 814*a*-2, 814*a*-3, 813*a*-3, 813*a*-2 connected by edges 817*a*-2, 818-3, 816*a*-2, 818-2}, {face 822-3 formed by nodes 814*a*-3, 814*a*-4, 813*a*-4, 813*a*-3 connected by edges 817*a*-3, 818-4, 816*a*-3, 818-3}, {face 822-4 formed by nodes 814*a*-4, 814*a*-5, 813*a*-5, 813*a*-4 connected by edges 817*a*-4, 818-5, 816*a*-4, 818-4}, {face 822-5 formed by nodes 814*a*-5, 814*a*-6, 813*a*-6, 813*a*-5 connected by edges 817*a*-5, 818-6, 816*a*-5, 818-5}, and {face 822-6 formed by nodes 814*a*-6, 814*a*-1, 813*a*-1, 813*a*-6 connected by edges 817*a*-6, 818-1, 816*a*-6, 818-6}.

Also shown in the representation 800*a* of FIG. 8A, coplanar to the respective beam nodes 811*a*, 809*a*, are additional contact faces, specifically a proximal contact face 824*a* and a distal contact face 823*a*, drawn respectively according to the user-specified L-beam proximal cross-sectional geometry 820*a* and distal cross-sectional geometry 819*a*. Proximal contact face 824*a* is formed by nodes 814*a*-1, 814*a*-2, 814*a*-3, 814*a*-4, 814*a*-5, 814*a*-6 connected by edges 817*a*-1, 817*a*-2, 817*a*-3, 817*a*-4, 817*a*-5, 817*a*-6. Distal contact face 823*a* is formed by nodes 813*a*-1, 813*a*-2, 813*a*-3, 813*a*-4, 813*a*-5, 813*a*-6 connected by edges 816*a*-1, 816*a*-2, 816*a*-3, 816*a*-4, 816*a*-5, 816*a*-6.

FIG. 8A illustrates example contact entities which may be generated according to step 515 of the method 500, in particular, proximal contact nodes 814*a*-1, 814*a*-2, 814*a*-3, 814*a*-4, 814*a*-5, 814*a*-6 and distal contact nodes 813*a*-1, 813*a*-2, 813*a*-3, 813*a*-4, 813*a*-5, 813*a*-6; longitudinal contact edges 818-1, 818-2, 818-3, 818-4, 818-5, 818-6, proximal contact edges 817*a*-1, 817*a*-2, 817*a*-3, 817*a*-4, 817*a*-5, 817*a*-6, and distal contact edges 816*a*-1, 816*a*-2, 816*a*-3, 816*a*-4, 816*a*-5, 816*a*-6; and longitudinal contact faces 822-1, 822-2, 822-3, 822-4, 822-5, 822-6, proximal contact face 824*a*, and distal contact face 823*a*, all as detailed hereinabove.

Additionally, rounded corners have been incorporated into the cross-sectional geometries 820*a*, 819*a* through inclusion of a corner radius parameter as described hereinabove with reference to FIGS. 6B and 7. The corner radius parameter dictates surface thickness of the beam element model 805*a*. As such, contact edges 818-1, 818-2, 818-3, 818-4, 818-5, 818-6 may not represent the outermost extremities of the beam element model 805*a*, but rather a central axis of a cylinder defined by the corner radius applied to the cross-sectional geometries 820*a*, 819*a* centered about the contact nodes 814*a*-1, 814*a*-2, 814*a*-3, 814*a*-4, 814*a*-5, 814*a*-6, 813*a*-1, 813*a*-2, 813*a*-3, 813*a*-4 813*a*-5, 813*a*-6. A portion of the surface of the cylinder may thus actually represent at least a portion of the surface of the beam element model 805*a*. According to the present disclosure, a mesh, such as mesh 300*c* of FIG. 3C, may be generated surrounding a beam element model, e.g., model 805*a*, based on the automatically generated contact entities 515, e.g., contact entities 814*a*-1, 814*a*-2, 814*a*-3, 814*a*-4, 814*a*-5, 814*a*-6, 813*a*-1, 813*a*-2, 813*a*-3, 813*a*-4, 813*a*-5, 813*a*-6, 818-1, 818-2, 818-3, 818-4, 818-5, 818-6, 817*a*-1, 817*a*-2, 817*a*-3, 817*a*-4, 817*a*-5, 817*a*-6, 816*a*-1, 816*a*-2, 816*a*-3, 816*a*-4, 816*a*-5, 816*a*-6, 822-1, 822-2, 822-3, 822-4, 822-5, 822-6, 824*a*, 823*a*. Motion of the mesh may then be constrained to follow motion of the beam element model 805*a*, e.g., according to step 535 of the method 500 of FIG. 5, based on the automatically generated contact entities 515.

Figure 8B:
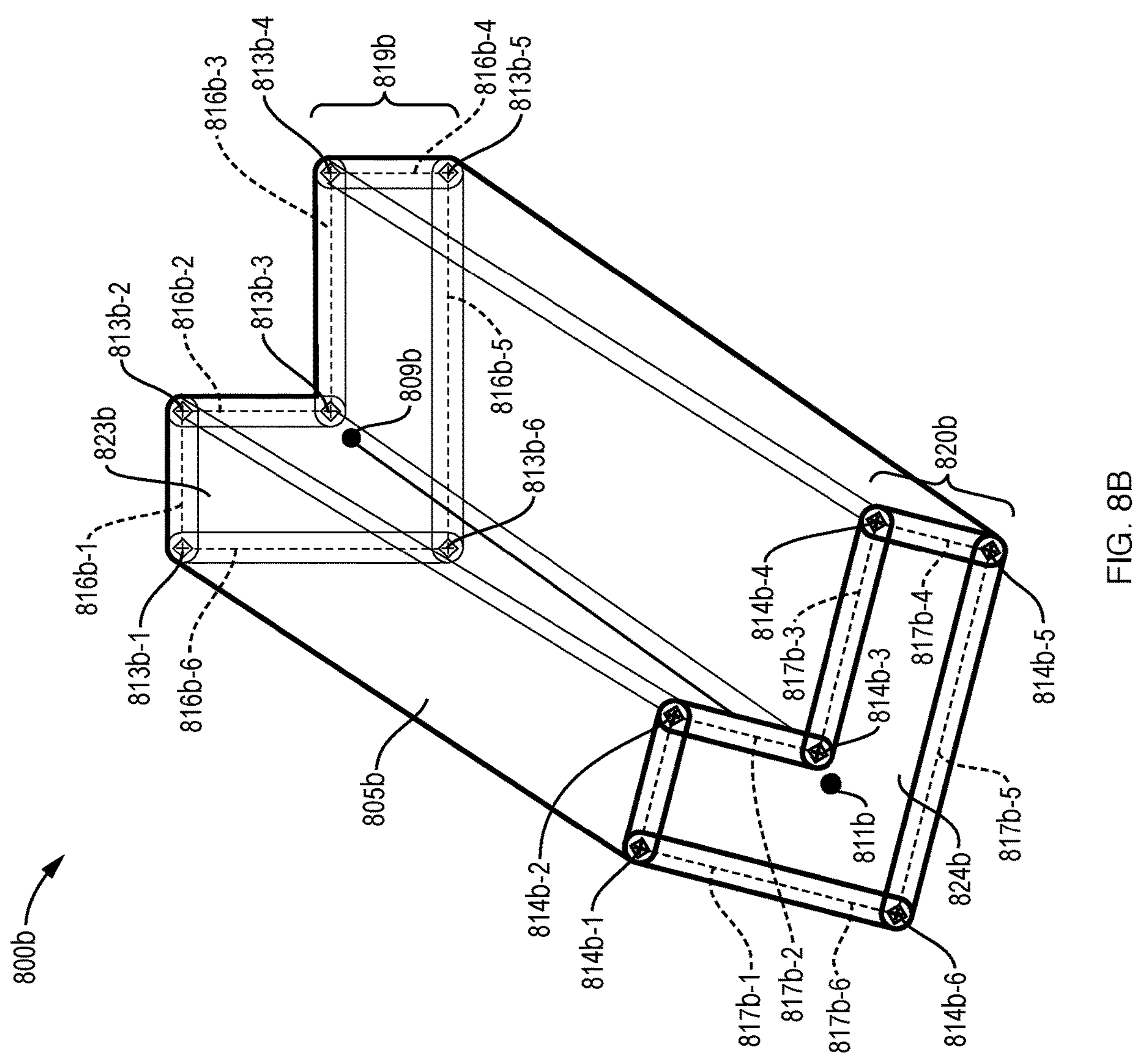
FIG. 8B illustrates a beam element model with the example cross-sectional geometry of FIG. 8A, representing a component of a real-world object twisting according to an embodiment.

FIG. 8B shows a manipulated representation 800*b* of an example beam element model 805*b*, representing the beam element model 805*a* of FIG. 8A after undergoing a twisting event. Motion of automatically generated contact entities 814*b*-1, 814*b*-2, 814*b*-3, 814*b*-4, 814*b*-5, 814*b*-6, 813*b*-1, 813*b*-2, 813*b*-3, 813*b*-4, 813*b*-5, 813*b*-6, 817*b*-1, 817*b*-2, 817*b*-3, 817*b*-4, 817*b*-5, 817*b*-6, 816*b*-1, 816*b*-2, 816*b*-3, 816*b*-4, 816*b*-5, 816*b*-6, 824*b*, 823*b*, during a simulation, is dictated by translations and rotations of beam nodes, such as beam node 811*b*, which has at least been rotated by an amount relative to beam node 811*a* of the view of representation 800*a* in FIG. 8A. A proximal contact face 824*b*, comprising beam node 811*b*, is shown in FIG. 8B as having been rotated, by an amount, about said beam node 811*b*. Longitudinal contact edges are not shown in FIG. 8B so as to preserve visibility of the other elements of the figure, and, as such, longitudinal contact edges are not expressly illustrated in FIG. 8B. The beam element model 805*b* is constructed based on proximal beam node 811*b* and distal beam node 809*b*, shown at opposing longitudinal ends of the beam 805*b*. At corresponding longitudinal ends, proximal contact nodes 814*b*-1, 814*b*-2, 814*b*-3, 814*b*-4, 814*b*-5, 814*b*-6 and distal contact nodes 813*b*-1, 813*b*-2, 813*b*-3, 813*b*-4, 813*b*-5, 813*b*-6 are shown.

The representation 800*b* includes contact edges, particularly, proximal contact edges 817*b*-1, 817*b*-2, 817*b*-3, 817*b*-4, 817*b*-5, and 817*b*-6 connecting the proximal contact nodes 814*b*-1, 814*b*-2, 814*b*-3, 814*b*-4, 814*b*-5, and 814*b*-6. In particular, contact edge 817*b*-1 connects contact nodes 814*b*-1 and 814*b*-2, contact edge 817*b*-2 connects contact nodes 814*b*-2 and 814*b*-3, contact edge 817*b*-3 connects contact nodes 814*b*-3 and 814*b*-4, contact edge 817*b*-4 connects contact nodes 814*b*-4 and 814*b*-5, contact edge 817*b*-5 connects contact nodes 814*b*-5 and 814*b*-6, and contact edge 817*b*-6 connects contact nodes 814*b*-6 and 814*b*-1. Likewise, the representation 800*b* includes additional contact edges, particularly distal contact edges 816*b*-1, 816*b*-2, 816*b*-3, 816*b*-4, 816*b*-5, and 816*b*-6, connecting distal contact nodes 813*b*-1, 813*b*-2, 813*b*-3, 813*b*-4, 813*b*-5, and 813*b*-6. Contact edge 816*b*-1 connects contact nodes 813*b*-1 and 813*b*-2, contact edge 816*b*-2 connects contact nodes 813*b*-2 and 813*b*-3, contact edge 816*b*-3 connects contact nodes 813*b*-3 and 813*b*-4, contact edge 816*b*-4 connects contact nodes 813*b*-4 and 813*b*-5, contact edge 816*b*-5 connects contact nodes 813*b*-5 and 813*b*-6, and contact edge 816*b*-6 connects contact nodes 813*b*-6 and 813*b*-1.

Contact faces, specifically a proximal contact face 824*b* and a distal contact face 823*b*, are drawn in FIG. 8B respectively according to the user-specified L-beam proximal cross-sectional geometry 820*b* and distal cross-sectional geometry 819*b*. Proximal contact face 824*b* is formed by nodes 814*b*-1, 814*b*-2, 814*b*-3, 814*b*-4, 814*b*-5, 815*b*-6 connected by edges 817*b*-1, 817*b*-2, 817*b*-3, 817*b*-4, 817*b*-5, 817*b*-6. Distal contact face 823*b* is formed by nodes 813*b*-1, 813*b*-2, 813*b*-3, 813*b*-4, 813*b*-5, 813*b*-6 connected by edges 816*b*-1, 816*b*-2, 816*b*-3, 816*b*-4, 816*b*-5, 816*b*-6.

Contact entities, which may be generated according to step 515 of the method 500, are shown in the representation 800*b*. In particular, the contact entities in FIG. 8B include proximal contact nodes 814*b*-1, 814*b*-2, 814*b*-3, 814*b*-4, 814*b*-5, 814*b*-6 and distal contact nodes 813*b*-1, 813*b*-2, 813*b*-3, 813*b*-4, 813*b*-5, 813*b*-6; proximal contact edges 817*b*-1, 817*b*-2, 817*b*-3, 817*b*-4, 817*b*-5, 817*b*-6, and distal contact edges 816*b*-1, 816*b*-2, 816*b*-3, 816*b*-4, 816*b*-5, 816*b*-6; proximal contact face 824*b*, and distal contact face 823*b*, all as referenced hereinabove. Not shown in FIG. 8B are longitudinal contact edges 818-1, 818-2, 818-3, 818-4, 818-5, 818-6; and longitudinal contact faces 822-1, 822-2, 822-3, 822-4, 822-5, 822-6.

Figure 9:
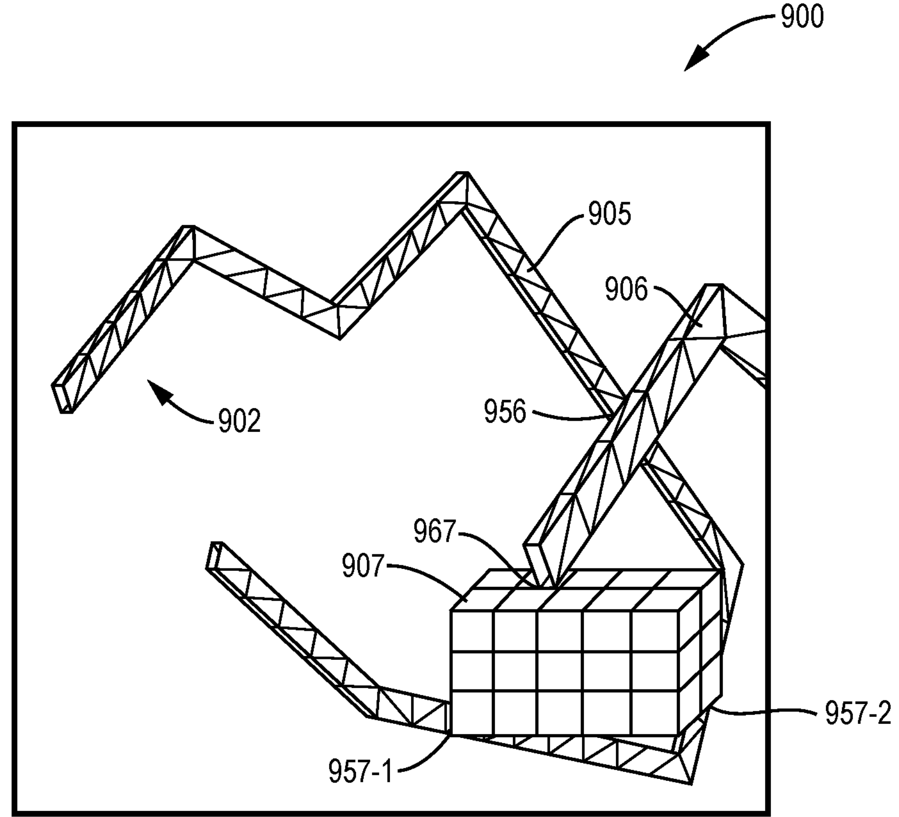
FIG. 9 illustrates example CAD models to be used in embodiments to automatically determine contact behavior.

FIG. 9 shows an example CAD model 900 including a separate first and second beam element model 905 and 906. Each beam element model 905, 906 is shown in FIG. 9 to have multiple connected parts (portions) as defined by the apparent multiple disparate beam element orientations depicted within each beam element model 905, 906. Also shown in FIG. 9 is an example modeled rectangular solid 907. Any solid characterized by any shape that one of skill in the art would not think of as a beam element may be so modeled for simulations of contact events with beam elements. Also depicted in FIG. 9 are a point of contact 956 between the first and second beam element models 905, 906, two points of contact 957-1, 957-2 between the first beam element model 905 and the rectangular solid 907, and a point of contact 967 between the second beam element model 906 and the rectangular solid 907.

Embodiments described herein may be utilized to model and simulate behavior of the beams 905 and 906. In an embodiment, contact entities are automatically generated using the embodiments described herein for portions of the beams 905 and 906 that may interact with each other or with other objects or bodies. In other words, embodiments may be used to model and simulate portions of the beams 905 and 906 involved in the contacts 956, 957-1, 957-2, and 967. Further, an implementation may utilize the methods described herein, e.g., the method 500, to model and simulate portions of the beams 905 and 906 involved in the contacts 956, 957-1, 957-2, and 967 while using existing methods for portions of the beams 905 and 906 not involved in the contact.

For example, the beam elements 902 of beam element model 905 in the upper-left of FIG. 9 are not close to being in contact with other objects or beam element models. An example implementation identifies such regions (which often evolve during a simulation) and can implement a simulation where the portion 902 of beam element model 905 is modeled with an existing method where contact entities are not automatically generated and other portions of the beam element model 905 are modeled using the methods described herein. In this way, embodiments can enhance computational performance and implement simulations to determine contact behavior that bypass computations involving more detailed surface representations in regions not involved in the contact (contact points 956, 957-1, 957-2, and 967).

As illustrated by the forgoing various non-limiting examples, the automatically generated contact entities of embodiments define or otherwise logically serve as potential points of contact on the model for purposes of simulation of modeled object behavior. Such defined points of contact increase accuracy of simulations heretofore unachieved in the art.

Figure 10A:
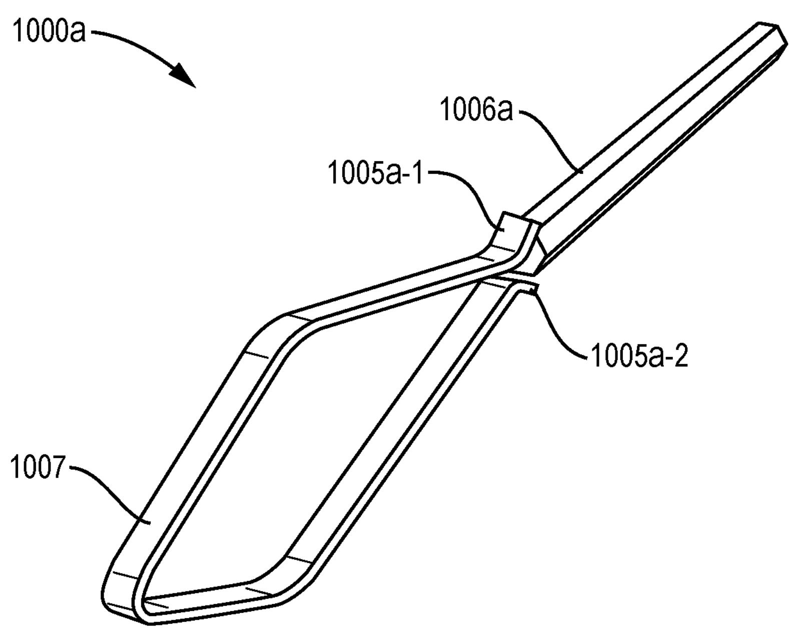
FIGS. 10A-B illustrate beam element models, representing components of a pair of example real-world objects, that can be used in an embodiment to automatically determine mutual contact behavior of the objects.

FIG. 10A shows an example CAD model 1000*a* including a model of a pair of tweezers 1007 comprising beam segments such as tweezer tip segments respectively modeled by beam element models 1005*a*-1 and 1005*a*-2. The example model 1000*a* also includes a separate singular beam represented by a beam element model 1006*a*. Embodiments of the present invention may be utilized to simulate contact between the tweezer 1007 tips represented by the models 1005*a*-1 and 1005*a*-2 and the beam element model 1006*a*.

Figure 10B:
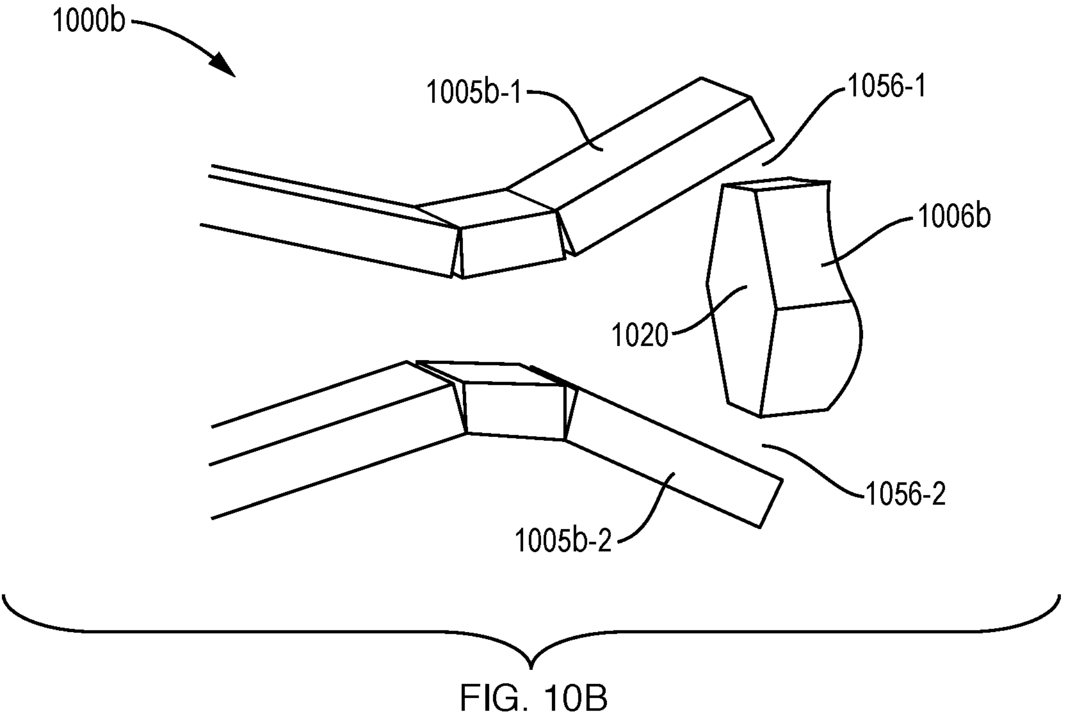

FIG. 10B shows another view 1000*b* of the example CAD model 1000*a* of FIG. 10A wherein the display showing the model has been configured through a zoom setting to show regions of interface 1056-1, 1056-2 between the respective beam element models 1005*b*-1, 1005*b*-2 of the tweezer tips and the beam element model 1006*b* of the singular beam. In FIG. 10B, it can be seen that the beam element model of the singular beam 1006*b* incorporates a hexagonal cross-sectional geometry 1020. The beam element models 1005*b*-1, 1005*b*-2 of the tweezer tips are assumed to have rectangular cross-sectional geometries. Such cross-sectional geometries are not explicitly and completely shown in the figure, but can be inferred from the apparent right angles between adjacent surfaces of the beam element models 1005*b*-1, 1005*b*-2 of the tweezer tips, given the perspective of view 1000*b*.

The models 1000*a* and 1000*b* illustrate advantages and benefits of embodiments. To illustrate, imagine the singular beam element model 1006*b* being configured to rotate about an axis central to its cross-sectional area and perpendicular to its cross-sectional plane, while the beam element models 1005*b*-1, 1005*b*-2 of the tweezer tips are configured to mutually compress towards, and ultimately make contact with, the singular beam element model 1006*b*. In such a state, the tweezer tips may be understood to be pinching the end of the singular beam element. One would expect deflection of motion of the beam element models 1005*b*-1, 1005*b*-2 of the tweezer tips as at least the first vertex of the hexagonal cross-sectional geometry 1020 of the singular beam element comes in contact with the beam element models 1005*b*-1, 1005*b*-2 of the tweezer tips during rotation of the singular beam element model 1006*b*. Assuming that sufficient spring resistance is built into the tweezers 1007 of the example model so as to maintain the pinching of the singular beam element between the tweezer tips, one would expect a bouncing effect to be exhibited by the beam element models 1005*b*-1, 1005*b*-2 of the tweezer tips as the singular beam element model 1006*b* continues to rotate and vertices of the hexagonal cross-sectional geometry 1020 pass between the beam element models 1005*b*-1, 1005*b*-2 of the tweezer tips.

It is made readily apparent by FIG. 10B that if contact events involving the hexagonal cross-sectional geometry 1020 of the singular beam element model 1006*b* were simulated using existing methods where all beams are treated as having circular cross-sectional areas, such a simulation would fail to predict any significant amount of deflection of motion or bouncing in the beam element models 1005*b*-1, 1005*b*-2 of the tweezer tips as the singular beam element model 1006*b* rotates between the beam element models 1005*b*-1, 1005*b*-2 of the tweezer tips.

In addition, if the cross-sectional geometries of the beam element models 1005*b*-1, 1005*b*-2 of the tweezer tips are rectangular as assumed above, the beam element models 1005*b*-1, 1005*b*-2 of the tweezer tips would likewise be treated as having circular cross-sectional areas in contact simulations implemented using existing methods. Existing methods would establish circular cross-sections for contact calculations by circumscribing a circular area about a rectangular cross-section of each beam element model 1005*b*-1, 1005*b*-2, thus enlarging the respective cross-sectional areas under consideration. As a result, using existing methods, contact simulations involving beam element models 1005*b*-1, 1005*b*-2 would identify contact events that physically do not occur. In other words, using existing methods, regions of interface 1056-1, 1056-2 would appear artificially large, rendering the simulation inaccurate. As such, the methods and systems described herein support contact simulations with increased accuracy over contact simulations implemented using existing methods by considering true cross-sectional geometries of the beam element models involved.

Structural simulations of dynamic events with central difference time integration require very small time increment or step sizes, thus often requiring, for example, at least 100,000 increments or steps. A simulation will often involve, for example, a number on the order of ten million contact nodes, edges, and faces. The claimed methods, systems, and products provide for reasonable simulation run-times by enabling efficient determination of which combinations of contact entities are actively in contact and what contact forces should be generated at each increment or step. The claimed methods, systems, and products impart, to each contact entity, characteristics that promote efficient and parallelizable processes. For example, the claimed methods, systems, and products keep the total number of types of contact entities small to enable code development and maintenance to focus on a few types of combinations of entities.

Figure 11:
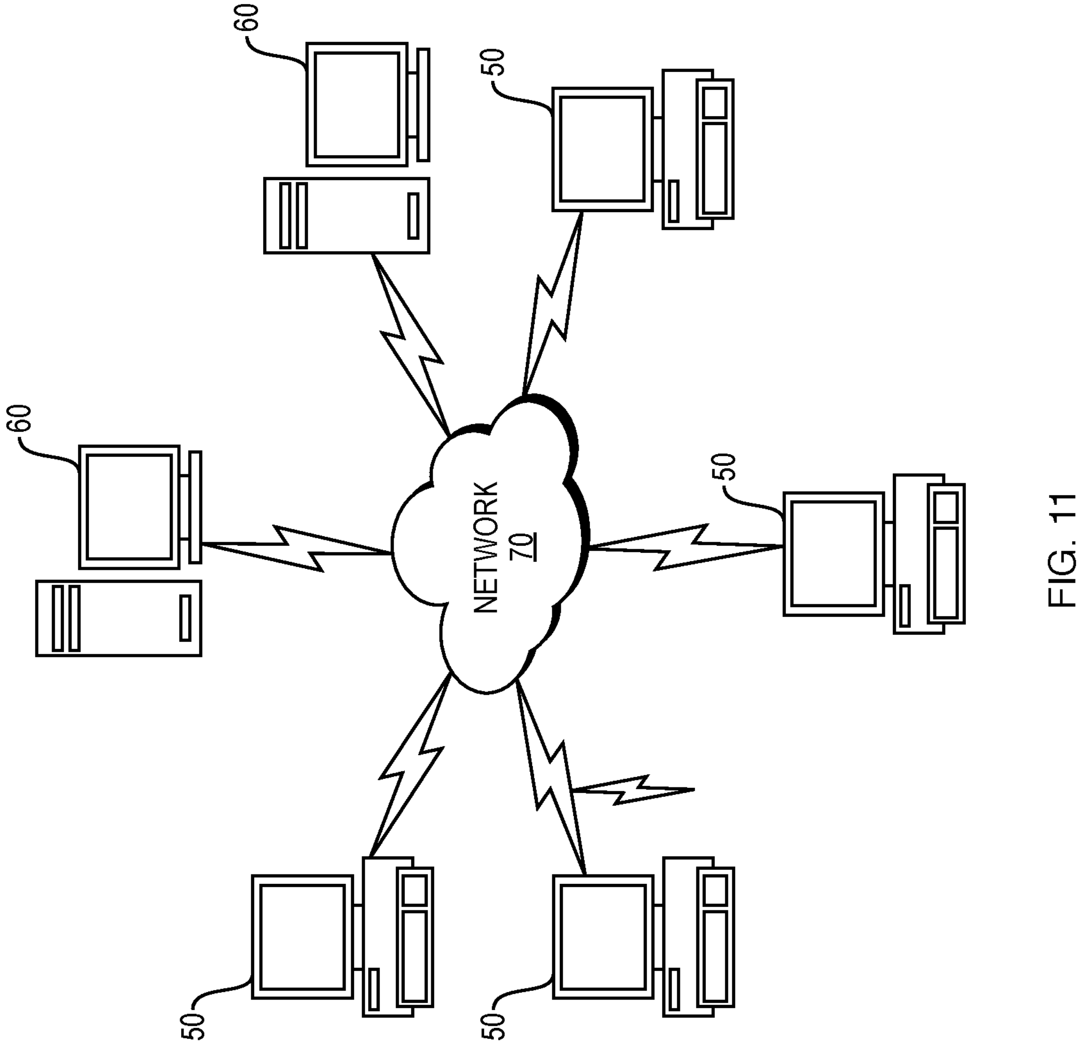
FIG. 11 depicts a computer network or similar digital processing environment in which embodiments of the present invention may be implemented.

FIG. 11 illustrates a computer network or similar digital processing environment in which embodiments of the present disclosure may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Figure 12:
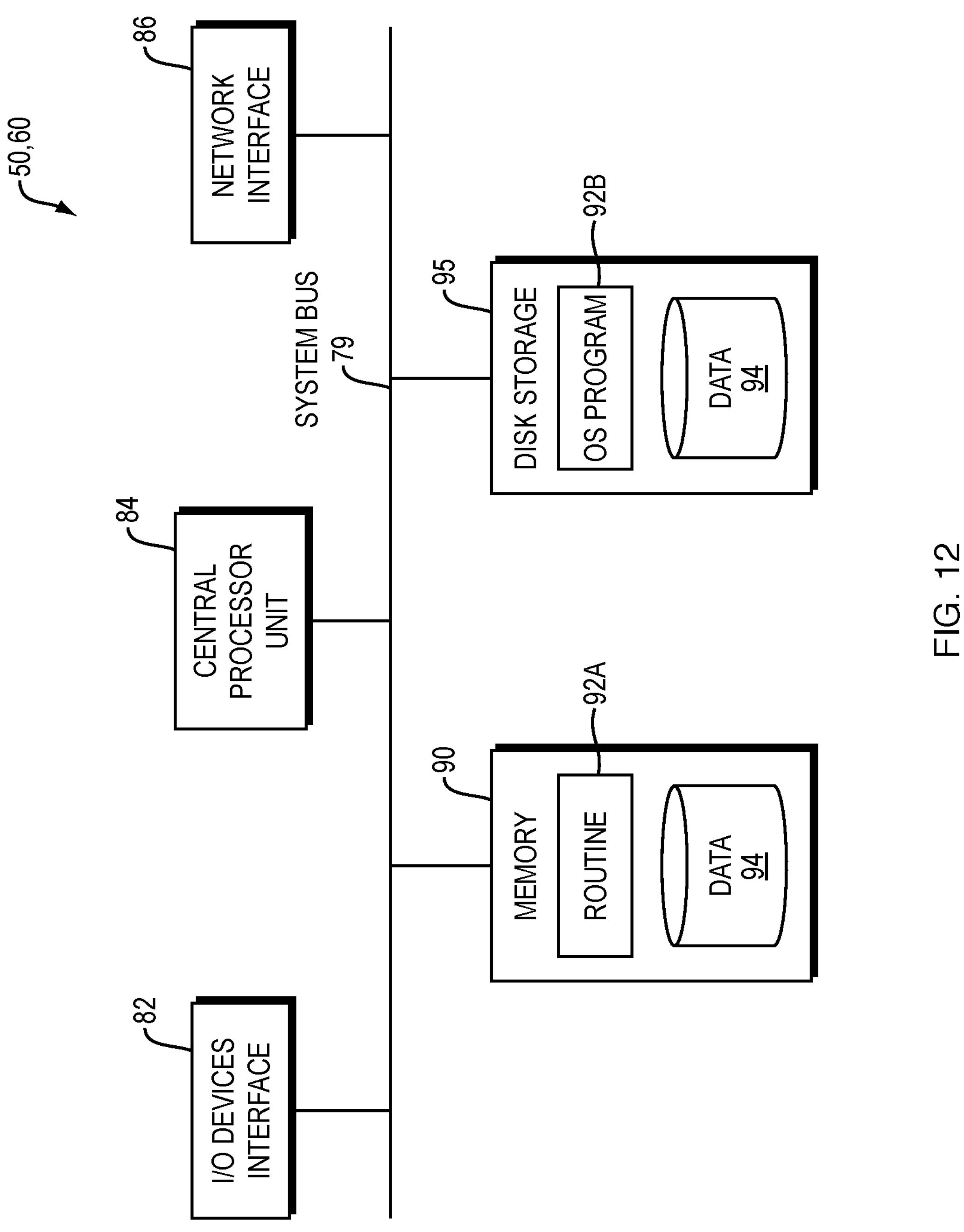
FIG. 12 is a block diagram of an example internal structure of a computer in the environment of FIG. 11.

FIG. 12 is a diagram of an example internal structure of a computer (e.g., client processor/device 50 or server computers 60) in the computer system of FIG. 11. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 11). Memory 90 provides volatile storage for computer software instructions 92 (shown in FIG. 12 as computer software instructions 92A and 92B) and data 94 used to implement an embodiment of the present disclosure, e.g., the method 500 and supporting graphical user interface discussed above. Disk storage 95 provides non-volatile storage for computer software instructions 92 and data 94 used to implement an embodiment of the present disclosure. A central processor unit 84 is also attached to the system bus 79 and provides for the execution of computer instructions.

In one embodiment, the processor routines 92 and data 94 are a computer program product (generally referenced 92), including a non-transitory computer-readable medium (e.g., a removable storage medium such as one or more DVD-ROM's, CD-ROM's, diskettes, tapes, etc.) that provides at least a portion of the software instructions for an embodiment. The computer program product 92 can be installed by any suitable software installation procedure, as is well known in the art. In another embodiment, at least a portion of the software instructions may also be downloaded over a cable communication and/or wireless connection. In other embodiments, the processor routines 92 and data 94 are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals may be employed to provide at least a portion of the software instructions for the present processor routines/program 92 and data 94.

Advantages provided by the claimed methods, systems, and products include more accurate modeling of contact events involving beam elements, at least in part due to computer implemented determination of contact entities of CAD beam element models. Having the outer surface representation of beam geometry generated by the software specifically to model effects of contact events helps ensure that the resulting surface representation is well suited for contact simulations with regard to performance, robustness, accuracy, and maintainability. A user would normally be disincentivized to manually construct a similar outer surface representation within the CAD software, due to common constraints such as time and cost to implement, as well as a significant potential for human error, given the complexities inherent to many real-world objects modeled by the software. The claimed methods, systems, and products effectively eliminate such disincentives and potential for human error, allowing users to realize and build upon benefits that were heretofore impractical or impossible to attain within a real product design setting.

Moreover, association between the original beam representation and the automatically-generated, detailed outer surface representation can be helpful in optimizing performance. The automatically generated contact entities in a particular region only need to be considered while parent beam elements are judged to be potentially involved in contact, based on crude screening methods.

While example embodiments have been particularly shown and described, it will be understood by those skilled in the art that various changes in form and details may be made therein without departing from the scope of the embodiments encompassed by the appended claims. For example, implementations may change the order in which operations are performed. Further, depending on the needs of an implementation, particular operations described herein may be implemented as a combined operation, eliminated, added to, or otherwise rearranged. Further, particular user interface operations relative to a mouse (e.g., click, drag, drop, etc.) are by way of illustration and not limitation. Other user interface operations for selecting, moving, placing, etc., model or design data are suitable.

What is claimed is:

1. A computer-implemented method for structurally simulating a real-world object to determine physical contact behavior of the real-world object, the method comprising, by a processor:

creating, in memory, a computer-based beam element model representing a component of a real-world object, the computer-based beam element model comprising beam nodes;

automatically generating contact entities based on (i) a cross-sectional geometry of the component of the real-world object and (ii) the created computer-based beam element model, wherein (a) the generated contact entities include contact nodes for the computer-based beam element model and (b) automatically generating the contact entities includes setting locations of the contact nodes based on the cross-sectional geometry;

establishing a mesh based on the generated contact entities by connecting the contact nodes via edges, the mesh surrounding the computer-based beam element model and representing outer surface geometry of the component of the real-world object; and determining physical contact behavior of the real-world object by performing a computer-based structural simulation using the computer-based beam element model and the established mesh surrounding the computer-based beam element model, wherein, in the structural simulation, motion of the mesh, surrounding the computer-based beam element model and representing outer surface geometry of the component of the real-world object, is constrained to correspond to motion of the beam nodes.

2. The method of claim 1 wherein connecting the contact nodes comprises:

instantiating the edges between the contact nodes.

3. The method of claim 1 wherein connecting the contact nodes comprises:

connecting the contact nodes, via the edges, in a tessellated pattern.

4. The method of claim 1 wherein establishing the mesh includes:

connecting contact entities generated based on a first cross-sectional geometry with corresponding contact entities generated based on a second cross-sectional geometry.

5. The method of claim 1 further comprising receiving a user indication of the cross-sectional geometry in form of a keyword.

6. The method of claim 5 further comprising:

providing a drop-down menu, the drop-down menu displaying a plurality of keywords, or representations thereof, wherein the user indication of the cross-sectional geometry is received via a user selection from the drop-down menu of the keyword from among the plurality of keywords.

7. The method of claim 1 where the beam nodes include a pair of beam nodes and, wherein creating the computer-based beam element model comprises:

defining an edge between the pair of beam nodes; and defining a material that comprises the component represented by the computer-based beam element model.

8. The method of claim 1 wherein the component of the real-world object is a first component and determining the physical contact behavior of the real-world object comprises:

receiving a finite element model of a second component; and performing the computer-based structural simulation using the computer-based beam element model, the established mesh, and the received finite element model of the second component to determine the physical contact behavior of the real-world object in response to contacting the second component.

9. A computer-aided design (CAD) system for structurally simulating a real-world object to determine physical contact behavior of the real-world object, the system comprising:

a processor; and a memory with computer code instructions stored thereon, the processor and the memory, with the computer code instructions, being configured to cause the system to:

create, in the memory, a computer-based beam element model representing a component of a real-world object, the computer-based beam element model comprising beam nodes;

automatically generate contact entities based on a cross-sectional geometry of the component of the real-world object and the created computer-based beam element model, wherein (i) the generated contact entities include contact nodes for the computer-based beam element model and (ii) automatically generating the contact entities includes setting locations of the contact nodes based on the cross-sectional geometry;

establish a mesh based on the generated contact entities by connecting the contact nodes via edges, the mesh surrounding the computer-based beam element model and representing outer surface geometry of the component of the real-world object; and determine physical contact behavior of the real-world object by performing a computer-based structural simulation using the computer-based beam element model and the established mesh surrounding the computer-based beam element model, wherein, in the structural simulation, motion of the mesh, surrounding the computer-based beam element model and representing outer surface geometry of the component of the real-world object, is constrained to correspond to motion of the beam nodes.

10. The system of claim 9 wherein, in connecting the contact nodes, the processor and the memory, with the computer code instructions, are further configured to cause the system to:

instantiate the edges between the contact nodes.

11. The system of claim 9 wherein, in establishing the mesh, the processor and the memory, with the computer code instructions, are further configured to cause the system to:

connect generated contact entities of a first cross-sectional geometry with corresponding generated contact entities of a second cross-sectional geometry.

12. The system of claim 11 wherein, in establishing the mesh, the processor and the memory, with the computer code instructions, are further configured to cause the system to:

tessellate the mesh between the first and second cross-sectional geometries.

13. The system of claim 9 wherein the processor and the memory, with the computer code instructions, are further configured to cause the system to:

receive a user indication of the cross-sectional geometry in a form of a keyword.

14. The system of claim 13 further comprising:

a graphical display device configured to provide a drop-down menu, the drop-down menu including keywords, or representations thereof; and wherein the processor and the memory, with the computer code instructions, are further configured to cause the system to receive the user indication of the cross-sectional geometry via a user selection from the drop-down menu.

15. The system of claim 9 wherein the beam nodes include a pair of beam nodes and wherein, in creating the computer-based beam element model, the processor and the memory, with the computer code instructions, are further configured to cause the system to:

define an edge between the pair of the beam nodes; and define a material comprising the component represented by the computer-based beam element model.

16. The system of claim 9 wherein the component of the real-world object is a first component and, in determining the physical contact behavior of the real-world object, the processor and the memory, with the computer code instructions, are further configured to cause the system to:

receive a finite element model of a second component; and perform the computer-based structural simulation using the computer-based beam element model, the established mesh, and the received finite element model of the second component to determine the physical contact behavior of the real-world object in response to contacting the second component.

17. A computer program product for structurally simulating a real-world object to determine physical contact behavior of the real-world object, the computer program product comprising:

a non-transitory computer-readable medium having computer-readable program instructions stored thereon, the instructions, when executed by a processor, causing the processor to:

create, in a database, a computer-based beam element model representing a component of a real-world object, the computer-based beam element model comprising beam nodes;

automatically generate contact entities based on a cross-sectional geometry of the component of the real-world object and the created computer-based beam element model, wherein (i) the generated contact entities include contact nodes for the computer-based beam element model and (ii) automatically generating the contact entities includes setting locations of the contact nodes based on the cross-sectional geometry;

establish a mesh based on the generated contact entities by connecting the contact nodes via edges, the mesh surrounding the computer-based beam element model and representing outer surface geometry of the component of the real-world object; and determine physical contact behavior of the real-world object by performing a computer-based structural simulation using the computer-based beam element model and the established mesh surrounding the computer-based beam element model, wherein, in the structural simulation, motion of the mesh, surrounding the computer-based beam element model and representing outer surface geometry of the component of the real-world object, is constrained to correspond to motion of the beam nodes.

18. The computer program product of claim 17 wherein the instructions cause the processor to connect the contact nodes by instantiating the edges between the contact nodes.

* * * * *